US005507404A

United States Patent [19]

Ryu

[11] Patent Number: 5,507,404

[45] Date of Patent: Apr. 16, 1996

[54] COLOR ELECTROLUMINESCENCE DISPLAY ELEMENT AND THE MANUFACTURING METHOD THEREOF

[75] Inventor: Jae H. Ryu, Kyunggi-Do, Rep. of Korea

[73] Assignee: Goldstar Co., Ltd., Seoul, Rep. of Korea

[21] Appl. No.: 331,375

[22] Filed: Oct. 28, 1994

[30] Foreign Application Priority Data

Oct. 30, 1993 [KR] Rep. of Korea ........................ 93-22820

[51] Int. Cl.$^6$ ........................ B29D 11/00

[52] U.S. Cl. ........................ 216/24; 216/5; 313/509

[58] Field of Search ........................ 216/5, 23, 25, 216/76, 77, 101, 102, 24; 313/505, 509

[56] References Cited

U.S. PATENT DOCUMENTS

| | | | |
|---|---|---|---|
| 4,853,079 | 8/1989 | Simopoulos | 216/25 |
| 4,914,348 | 4/1990 | Kameyama et al. | 313/509 |
| 4,977,350 | 12/1990 | Tanaka et al. | 313/505 |
| 5,156,924 | 10/1992 | Taniguchi et al. | 428/690 |
| 5,328,808 | 7/1994 | Sakamoto | 430/313 |

*Primary Examiner*—William Powell
*Attorney, Agent, or Firm*—Poms, Smith, Lande & Rose

[57] ABSTRACT

A color electroluminescence(EL) display element and the manufacturing method thereof which can improve an RC-time delay phenomenon and the contrast of the EL display element. According to the EL display element, an auxiliary metal electrode is formed on a transparent electrode. The auxiliary metal electrode is formed by forming on the transparent electrode a metal film having a high melting point and a low resistivity, such as molybdenenum, with a thickness of about 1000 Å, and then by selectively etching the metal film so that it remains on the boundary between each of R, G, and B color filters with a width of about 5 to 30 μm. The color filters are formed on a circular polarizing plate and sealed up with the auxiliary metal electrode, and thus the circular polarizing plate absorbs an external light incident to and reflected from a metal electrode.

11 Claims, 2 Drawing Sheets

COLOR ELECTROLUMINESCENCE DISPLAY ELEMENT AND THE MANUFACTURING METHOD THEREOF

BACKGROUND OF THE INVENTION

1. Field of the Invention

The present invention relates to a color electroluminescence display element, and more particularly to a color electroluminescence display element and the manufacturing method thereof which are capable of improving a RC-time delay phenomenon caused by a high resistance of a transparent electrode and the contrast of the electroluminescence display element.

2. Description of the Prior Art

Several kinds of flat display elements have been known: a liquid crystal display (LCD) element, a plasma display (PDP) element, an electroluminescence (EL) display element, and so forth. To carry out a high-density image display, the above elements should be completely colorized, and thus a number of studies therefor have been progressing so far. Among the elements have the LCD and the PDP now been completely colourized. Meanwhile, there has been great amounts of research for the development of an EL display element wherein a white light is produced and filtered for display with complete colors.

FIG. 1 is a cross-sectional view of a conventional EL display element utilizing the white light as mentioned above. According to the EL display element of FIG. 1, a metal electrode 2 is formed by vacuum-evaporating a metal such as aluminium on a glass substrate 1 with a thickness of about 2000 Å, and then by line-etching the formed metal utilizing photoetching technique. A first insulating layer 3 is formed by seating a dielectric material, such as SiON, $BaTa_2O_6$, $SrTIO_3$, etc., on the metal electrode 2 with a thickness of about 3000 Å by means of sputtering. A light-emitting layer 4 is formed by forming a fluorescent material for emitting a white light, such as SrS; Ce, Eu, X, ZnS; Pr, ZnS; Mn/SrS; Ce/ZnS; Mn, etc., on the first insulating layer 3 with a thickness of 0.5 to 1.5 μm by means of vacuum evaporation, multi-source deposition, etc. A second insulating layer 5 is formed by forming SiON, $BaTa_2O_6$, $SrTIO_3$, or the like on the light-emitting layer 4 with a thickness of about 3000 Å by means of sputtering. A transparent electrode 6 is formed by forming a transparent film layer of indium tin oxide(ITC) on the second insulating layer 5 with a thickness of about 2000 Å and %hen by line-etching the transparent film layer in a perpendicular direction of the metal electrode 2 by means of photoetching. The panel manufactured by the above process is referred to as an EL panel 10.

In addition, on a transparent sealing plate 9, which is prepared for protecting the EL panel 10 from humidity, oxygen, or or the like, a color filter 8 is formed. The color filter 8 is arranged on the transparent sealing plate 9 so that red(R), green(G), and blue(B) color filters, which constitute %he color filter 8, are positioned in order. The widths of the R, G, and B color filters are the same as those of the metal electrode 2 and the transparent electrode 6, respectively. The transparent sealing plate 9 and the color filter 8 are sealed together with a thickness of several μm. The panel manufactured by the above process is referred to as a filter panel 20.

The manufacture of the color EL display element is completed by injecting silicon oil 7 between the EL panel 10 and the filter panel 20.

In the conventional EL display element having the above construction, if an AC voltage of 200 V or so is applied between the metal electrode 2 and the transparent electrode 6, hot electrons are created by a strong electric field based on the applied AC voltage. The hot electrons collide with doped molecule centers in the light-emitting layer 4, such as cerium(Ce), praseodymium(Pr), manganese(Mn), etc., and excite electrons of the molecular centers from its valence band to its conduction band. The electrons excited into the conduction band are instable, and thus fall to the valence band with the emission of a natural light.

The light from the EL panel 10 according to the above process is a white light containing the wavelengths of R, G, and B color lights at a uniform rate. The white light is separately emitted by both the metal electrode 2 and the transparent electrode 6, and is filtered into the color lights of R, G, and B through the color filter 8. Thus, the combination of three filtered color lights makes it possible to express a colorific display.

However, since the conventional EL display element colorized by using the white light employs an aluminium-coated metal electrode, it has the disadvantage that a needless light reflected from the very surface of the aluminium to the user, and thus the quality of contrast deteriorates. Also, the distance between the color filter 8 and the light-emitting layer 4 is so distant %hat a phenomenon of parallax between each pixel may be caused. It has also the disadvantage that the RC-time delay may occur, when a wide-area EL display element for a VGA monitor or an HDTV, is driven, due to a high resistance of the transparent electrode,

SUMMARY OF THE INVENTION

The present invention has been made to overcome the problems involved in the prior art.

It is an object of the present invention to provide a color EL display element and the manufacturing method thereof which can improve the contrast of the EL display element and solve the problem of the Re-time delay by employing a metal having a high melting point and a low resistivity, such as molybdenum(Mo), as an auxiliary electrode.

In one aspect of the present invention, there is provided a method of manufacturing a color EL display element, comprising the steps of:

forming a metal electrode on a glass substrate by forming an aluminium film on the glass substrate and then by patterning the aluminium film by means of selective etching;

forming in turn a first insulating layer, a light-emitting layer for emitting a white light, and a transparent electrode on the metal electrode;

forming an auxiliary metal electrode on the transparent electrode by forming a metal film on the transparent electrode with a predetermined thickness and then by patterning the metal film by means of selective etching;

forming in red, green, and blue color filters per pixel on a circular polarizing plate in order; and injecting silicon oil between the auxiliary metal electrode and the color filters.

In another aspect of the present invention, there is provided a color EL display element, comprising:

a glass substrate;

a metal electrode formed on said glass substrate with predetermined pattern;

a light-emitting layer formed on the metal electrode via a first insulating layer;

a transparent electrode formed on said light-emitting layer via a second insulating layer, said light-emitting layer emitting a white light by an electric field created between said metal electrode and said transparent electrode;

an auxiliary metal electrode formed on said transparent electrode with a predetermined pattern; and a color filter for filtering said white light emitted from said light-emitting layer and passing through said transparent electrode and said auxiliary metal electrode into red, green, and blue lights, said color lilts comprising a circular polarizing plate and red, green, and blue color filters formed on the circular polarising plate in order;

wherein said color filter and said auxiliary metal electrode are sealed up together by injecting silicon oil therebetween.

BRIEF DESCRIPTION OF THE DRAWINGS

The above object and other advantages of the present invention will become more apparent by describing the preferred embodiment of the present invention with reference to the accompanying drawings, in which.

DETAILED DESCRIPTION OF THE PREFERRED EMBODIMENT

Figure 1:
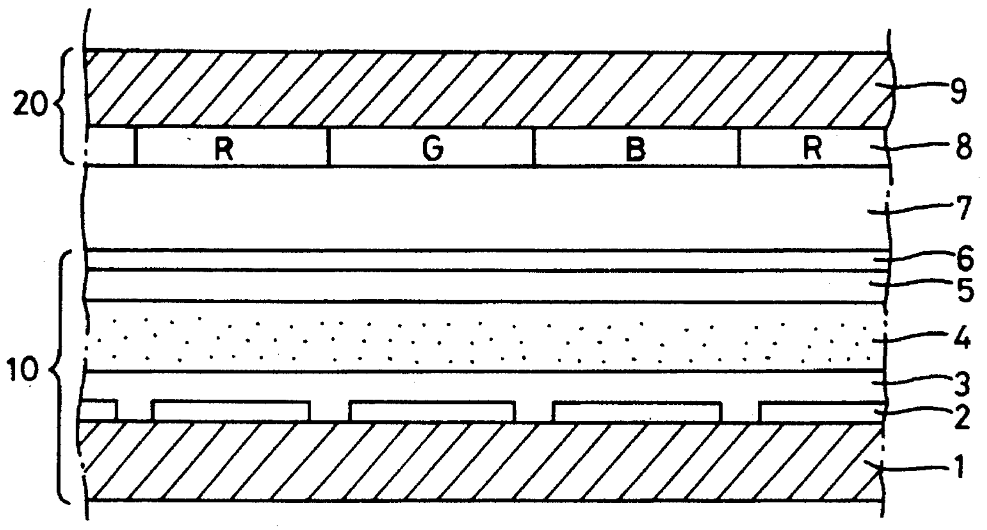
FIG. 1 (PRIOR ART)
FIG. 1 a cross-sectional view of a conventional color EL display element.
Figure 2:
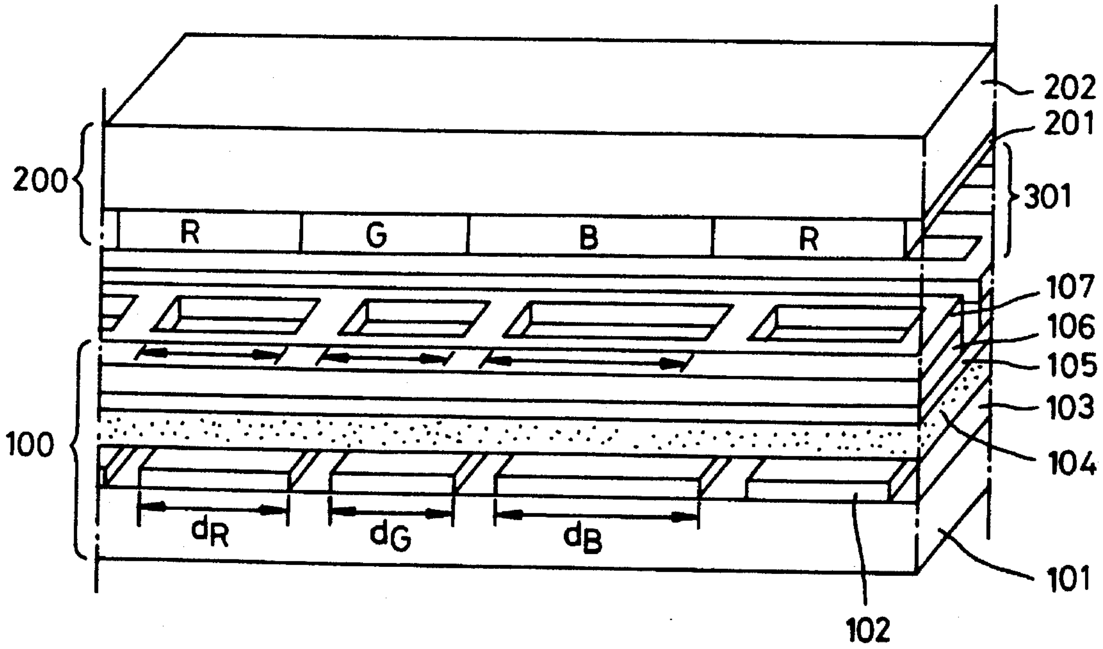
FIG. 2 is an exploded perspective view of a color EL display element according to the present invention.

FIG. 2 is a cross-sectional view of a color EL display element according to the present invention. Referring to FIG. 2, the color EL display element according to the present invention is provided with a glass substrate 101, a metal electrode 102, a first insulating layer 103, a light-emitting layer 104, a second insulating layer 105, a transparent electrode 106, an auxiliary metal electrode 107, silicon oil 301, a color filter 201, and a circular polarizing plate 202.

The glass substrate 101, the first insulating layer 103, the light-emitting layer 104, the second insulating layer 105, and the transparent electrode 106 are respectively formed in the same manner as in the conventional EL display device.

The metal electrode 102 is formed by coating aluminium on the glass substrate 101 with a thickness of 1000 to 2000 Å by means of sputtering, and then by etching the aluminium film selectively. The light traveling to the rear side of the EL display element is reflected from the metal electrode 102 to user, resulting in improvement of the brightness of the EL display element. The metal electrode 103 has various widths of $d_R$, $d_G$, and $d_B$, which correspond to those of the respective R, G, and B color filters. Three pieces of the metal electrode 102 correspond to one pixel.

In order to obtain a complete colorization of the white light emitted by the electric field in the light-emitting layer 104, the ideal luminance ratio of R, G, and B color lights should be 3:6:1. Accordingly the widths $d_R$, $d_G$, and $d_B$ of the metal electrodes should be determined considering the luminance ratio of wavelengths of the white light emitted from the light-emitting layer 104.

Figure 3:
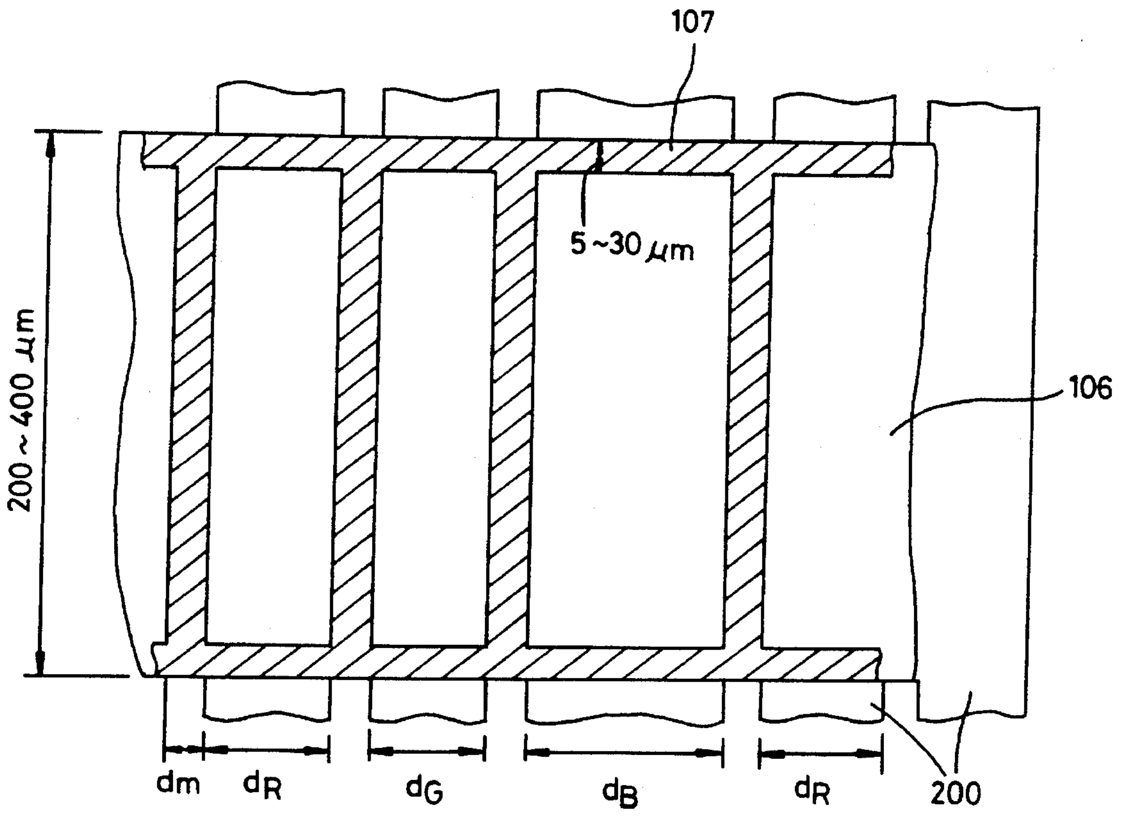
FIG. 3 is a plane view explaining the arrangement of the electrodes of the EL display element in FIG. 2.

Since the ITO transparent electrode 106 has a high resistance value and a narrow width of 200 to 400 μm, the EL display element is similar to a capacitor in structure,and thus causes an RC-time delay to occur. According to the present invention, the auxiliary metal electrode 107 is formed by coating molybdenum(Mo) having a high melting point on the ITO transparent electrode with a thickness of 1000 Å by means of sputtering or vacuum evaporation, and then by selectively etching the Mo film. Referring to FIG. 3, the width of the auxiliary metal electrode 107 which remains on the boundary between each color filter of each pixel is determined to be in the range of about 5 to 30 μm. The auxiliary metal electrode 107 prevents the RC-time delay phenomenon of the EL display element caused by the high resistance value of the transparent electrode 106.

Meanwhile, a filter panel 200 is constructed by forming a the color filter 201 on the circular polarizing plate 202. The color filter 102 is formed by line-etching the R, G, and B color liters so that the widths thereof correspond to those of the metal electrode 102 pieces per pixel. The manufacture of the color EL display element is completed by injecting the silicon oil 301 between the EL panel 100 and the filter panel 200, and by sealing up both of them.

In the color EL display element manufactured as above, the incident light perpendicularly passing through the circular polarizing plate 202 is reflected from the metal electrode, and the reflected light is absorbed in the circular polarizing plate 202, resulting in improvement of the contrast of the EL display element.

From the foregoing, according to the present invention, the auxiliary metal electrode is formed between R, G, and B color filters of each pixel with a predetermined width to prevent the RC-time delay caused by the transparent electrode having a high resistance value. Further, if any light, which may be an incident light or an emitted light, is not perpendicular to the pixel, it would be screened, resulting in improvement of the contrast of the EL element. Furthermore, since the color filter is directly formed on the circular polarizing plate and then is sealed up with the EL panel, any external light reflected from the metal electrode is absorbed, preventing the contrast of the EL display element from deterioration.

While the present invention has been described and illustrated herein with reference to the preferred embodiment thereof, it will be understood by those skilled in the art that various changes in form and details may be made therein without departing from the spirit and scope of the invention.

What is claimed is:

1. A method of manufacturing a color electroluminescence display element, comprising the steps of:

forming a metal electrode on a glass substrate by forming an aluminum film on the glass substrate and then by patterning the aluminum film by means of selective etching;

forming in turn a first insulating layer, a light-emitting layer for emitting a white light, and a transparent electrode on the metal electrode;

forming an auxiliary metal electrode on the transparent electrode by forming a metal film on the transparent electrode and then by patterning the metal film by means of selective etching;

forming red, green, and blue color filters per pixel on a circular polarizing plate in order; and injecting silicon oil between the auxiliary metal electrode and the color filters.

2. A manufacturing method as claimed in claim 1, wherein at the metal electrode forming step, the aluminium film is evaporated with a thickness of about 1000 to 2000 Å by means of sputtering.

3. A manufacturing method as claimed in claim 1, wherein at the auxiliary metal electrode forming step, the metal film is evaporated with a thickness of about 1000 Å by means of sputtering.

4. A manufacturing method as claimed in claim 1, wherein at the auxiliary metal electrode forming step, the metal film is formed by means of vacuum evaporation.

5. A manufacturing method as claimed in claim 1, wherein at the auxiliary metal electrode forming step, the metal film is made of molybdenum.

6. A manufacturing method as claimed in claim 1, wherein at the auxiliary metal electrode forming step, the metal film is selectively etched so that the metal film remains on the boundary between each of the red, green and blue color filters with a width of about 5 to 30 μm.

7. A manufacturing method as claimed in claim 1, wherein the color filter forming step includes a substep of line-etching the red, green and blue color filters formed on the circular polarizing plate so that the widths of the red, green, and blue color filters remaining on the circular polarizing plate are the same as those of the metal electrodes per pixel, respectively, formed at the metal electrode forming step.

8. A color electroluminescence display element comprising:

a glass substrate;

a metal electrode formed on said glass substrate;

a light-emitting layer formed on the metal electrode via a first insulating layer;

a transparent electrode formed on said light-emitting layer via a second insulating layer, said light-emitting layer emitting a white light by an electric field created between said metal electrode and said transparent electrode;

an auxiliary metal electrode formed on said transparent electrode; and a color filter for filtering said white light emitted from said light-emitting layer and passing through said transparent electrode and said auxiliary metal electrode into red, green, and blue lights, said color filter comprising a circular polarizing plate and red, green, and blue color filters formed on the circular polarizing plate in order;

wherein said color filter and said auxiliary metal electrode are sealed up together by injecting silicon oil therebetween.

9. A color electroluminescence display element as claimed in claim 8, wherein the thickness of said auxiliary metal electrode is about 1000 Å.

10. A color electroluminescence display element as claimed in claim 8, wherein said auxiliary metal electrode is made of molybdenum.

11. A color electroluminescence display element as claimed in claim 8, wherein said auxiliary metal electrode is positioned on the boundary between each of said red, green, and blue color filters with a width of about 5 to 30 μm.

* * * * *